US 8,924,876 B1

(12) United States Patent
Joyce et al.

(10) Patent No.: US 8,924,876 B1
(45) Date of Patent: Dec. 30, 2014

(54) FILE-DRIVEN DRAG AND DROP

(75) Inventors: Scott Joyce, Foxboro, MA (US);
Sreenath Rajagopal, Natick, MA (US);
Anirudh Takkallapally, Natick, MA (US); Vijay Balasubramanian Srivatsa,
Boston, MA (US)

(73) Assignee: EMC Corporation, Hopkinton, MA (US)

( * ) Notice: Subject to any disclaimer, the term of this patent is extended or adjusted under 35 U.S.C. 154(b) by 1409 days.

(21) Appl. No.: 12/240,076

(22) Filed: Sep. 29, 2008

(51) Int. Cl.
*G06F 3/048* (2013.01)
*G06F 15/177* (2006.01)

(52) U.S. Cl.
USPC .......... 715/769; 715/734; 715/735; 715/764; 715/853

(58) Field of Classification Search
CPC ..................................... G06F 3/0486
USPC ................. 715/769, 853–855, 764, 770–771, 715/734–735
See application file for complete search history.

(56) References Cited

U.S. PATENT DOCUMENTS

| | | | | | |
|---|---|---|---|---|---|
| 5,608,860 | A | * | 3/1997 | Fitzpatrick et al. ........... | 715/826 |
| 5,701,137 | A | * | 12/1997 | Kiernan et al. ............... | 715/853 |
| 5,742,286 | A | * | 4/1998 | Kung et al. .................... | 715/839 |
| 5,754,179 | A | * | 5/1998 | Hocker et al. ................. | 715/835 |
| 5,774,120 | A | * | 6/1998 | Goddard et al. ............... | 715/845 |
| 5,848,272 | A | * | 12/1998 | Breggin et al. ............... | 719/315 |
| 5,848,424 | A | * | 12/1998 | Scheinkman et al. ........ | 715/210 |
| 5,884,298 | A | * | 3/1999 | Smith et al. ............................ | 1/1 |
| 6,393,429 | B1 | * | 5/2002 | Yagi et al. ...................... | 707/795 |
| 6,441,834 | B1 | * | 8/2002 | Agassi et al. .................. | 715/764 |
| 6,441,835 | B1 | * | 8/2002 | Pazel ............................. | 715/769 |
| 6,448,985 | B1 | * | 9/2002 | McNally ........................ | 715/784 |
| 6,538,669 | B1 | * | 3/2003 | Lagueux et al. .............. | 715/764 |
| 6,944,829 | B2 | | 9/2005 | Dando | |
| 6,966,033 | B1 | * | 11/2005 | Gasser et al. .................. | 715/738 |
| 7,007,033 | B1 | * | 2/2006 | Rothschiller et al. .................. | 1/1 |
| 7,019,743 | B1 | * | 3/2006 | Wainwright et al. ......... | 345/420 |
| 7,120,646 | B2 | | 10/2006 | Streepy, Jr. | |
| 7,254,385 | B2 | | 8/2007 | Atkin et al. | |
| 7,281,217 | B2 | * | 10/2007 | Choudhary et al. .......... | 715/764 |
| 7,293,237 | B1 | | 11/2007 | Knight et al. | |
| 7,315,985 | B1 | * | 1/2008 | Gauvin et al. ................. | 715/734 |
| 7,437,676 | B1 | * | 10/2008 | Magdum et al. .............. | 715/738 |
| 7,512,888 | B2 | * | 3/2009 | Sugino et al. ................. | 715/734 |
| 7,532,340 | B2 | | 5/2009 | Koppich et al. | |
| 8,230,384 | B1 | * | 7/2012 | Krishnan et al. .............. | 717/100 |

(Continued)

OTHER PUBLICATIONS

Wikipedia, "Markup language", printout pp. 1-5 from http://web.archive.org/web/20070614094750/http://en.wikipedia.org/wiki/Markup_language, dated Jun. 14, 2007.*

(Continued)

*Primary Examiner* — Amy Ng
*Assistant Examiner* — William Wong
(74) *Attorney, Agent, or Firm* — BainwoodHuang

(57) ABSTRACT

A method is provided, the method including (a) storing a set of drag-and-drop properties associated with an object in a properties file, the properties file being stored on a tangible computer readable medium, and (b) implementing a program in software. The program includes an instantiation of the object and a method for handling drag-and-drop features associated with the instantiated object with reference to the set of drag-and-drop properties stored in the properties file. Software and data structure methods are provided as well.

3 Claims, 5 Drawing Sheets

(56) References Cited

U.S. PATENT DOCUMENTS

| | | | |
|---|---|---|---|
| 2002/0003548 A1* | 1/2002 | Krusche et al. | 345/736 |
| 2002/0161777 A1* | 10/2002 | Smialek | 707/102 |
| 2002/0196271 A1* | 12/2002 | Windl et al. | 345/734 |
| 2003/0007005 A1* | 1/2003 | Kandogan | 345/763 |
| 2003/0037322 A1* | 2/2003 | Kodosky et al. | 717/162 |
| 2003/0066032 A1* | 4/2003 | Ramachandran et al. | 715/513 |
| 2003/0074527 A1* | 4/2003 | Burton et al. | 711/114 |
| 2003/0110469 A1 | 6/2003 | Jackson | |
| 2003/0160810 A1 | 8/2003 | Talley et al. | |
| 2003/0160825 A1* | 8/2003 | Weber | 345/769 |
| 2004/0001094 A1* | 1/2004 | Unnewehr et al. | 345/769 |
| 2004/0056896 A1* | 3/2004 | Doblmayr et al. | 345/769 |
| 2004/0150664 A1* | 8/2004 | Baudisch | 345/740 |
| 2005/0050471 A1* | 3/2005 | Hallisey et al. | 715/734 |
| 2005/0060653 A1* | 3/2005 | Fukase et al. | 715/724 |
| 2005/0066287 A1* | 3/2005 | Tattrie et al. | 715/769 |
| 2005/0246352 A1* | 11/2005 | Moore et al. | 707/100 |
| 2005/0246636 A1* | 11/2005 | Blagsvedt et al. | 715/700 |
| 2005/0251620 A1* | 11/2005 | Matsunami et al. | 711/114 |
| 2005/0268217 A1* | 12/2005 | Garrison | 715/505 |
| 2006/0036568 A1* | 2/2006 | Moore et al. | 707/1 |
| 2006/0070007 A1* | 3/2006 | Cummins et al. | 715/769 |
| 2006/0212822 A1* | 9/2006 | Facemire et al. | 715/769 |
| 2006/0259870 A1* | 11/2006 | Hewitt et al. | 715/762 |
| 2007/0006089 A1* | 1/2007 | Bales et al. | 715/769 |
| 2007/0016872 A1* | 1/2007 | Cummins et al. | 715/769 |
| 2007/0113194 A1* | 5/2007 | Bales et al. | 715/769 |
| 2007/0150834 A1* | 6/2007 | Muller et al. | 715/810 |
| 2008/0109743 A1* | 5/2008 | Gibson et al. | 715/769 |
| 2009/0132944 A1* | 5/2009 | Carr et al. | 715/769 |

OTHER PUBLICATIONS

Wikipedia, "Java (programming language)", printout pp. 1-15 from http://web.archive.org/web/20070208054322/http://en.wikipedia.org/wiki/Java_%28programming_languag e%29, dated Feb. 8, 2007.*

Scott Joyce, et al., "Method to Simplify Developing Software Having Localization," U.S. Appl. No. 12/238,926, filed Sep. 26, 2008.

* cited by examiner

FILE-DRIVEN DRAG AND DROP

BACKGROUND

In a typical data storage system management application, various physical and logical aspects of the data storage system may be displayed in a hierarchical manner on a graphical user interface (GUI). In order to re-arrange logical aspects of the data storage system, a typical implementation requires properties fields of the various elements to be textually modified. For example, in order to add a logical unit of storage (LUN) to a storage group, a storage group properties box is opened, and a button is clicked to indicate that a new LUN should be added to that storage group. This would bring up a dialog box asking the user to select a particular LUN from a list of known LUNs to add to that storage group.

SUMMARY

Unfortunately, these conventional data storage system management applications are deficient. In particular, they require a cumbersome procedure to rearrange elements. In contrast, embodiments of the present invention improve upon those conventional data storage system management applications by allowing a Drag & Drop (DnD) method of rearranging logical aspects of the data storage system. In a particular embodiment, the DnD feature is implemented with the aid of a properties file.

In one embodiment, a method is provided, the method including (a) storing a set of drag-and-drop properties associated with an object in a properties file, the properties file being stored on a tangible computer readable medium, and (b) implementing a program in software. The program includes an instantiation of the object and a method for handling DnD features associated with the instantiated object with reference to the set of DnD properties stored in the properties file.

In another embodiment, a method is provided, the method including (a) receiving an indication that a user is attempting to drag a graphical representation of an object, (b) determining the type of the object, (c) determining if the type of the object is identified by a source element in a properties file, the properties file being a text file written in a markup language and the properties file storing one or more source elements, each source element identifying a valid source for a DnD operation, (d) if the type of the object is identified by a source element in the properties file, allowing the user to drag the graphical representation of the object, and (e) if the type of the object is not identified by a source element in the properties file, forbidding the user from dragging the graphical representation of the object. In another embodiment, computer software for performing this method is provided. Other embodiments are also provided, such as a data structure for a properties file.

BRIEF DESCRIPTION OF THE DRAWINGS

The foregoing and other objects, features, and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
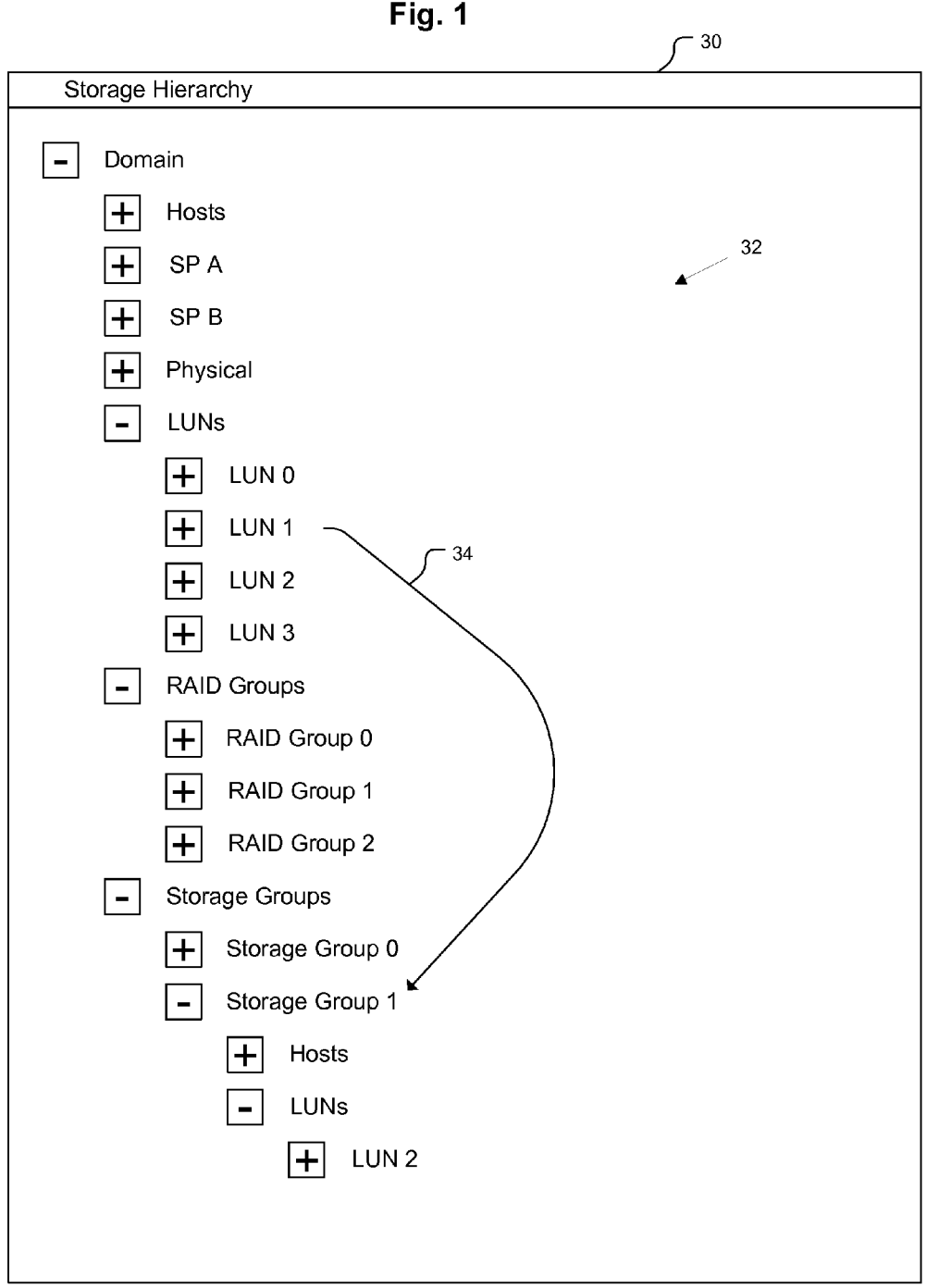
FIG. 1 illustrates an example computer window displaying an example object hierarchy in accordance with one embodiment. The figure also displays an example of a DnD operation.

FIG. 1 depicts a window 30 of a data storage system management application displaying an example object hierarchy 32 of the data storage system. For example, a domain is shown in an expanded format, having within it hosts, storage processor A, storage processor B, a physical folder, a LUN folder, a RAID groups folder, and a storage groups folder. The elements with a "+" sign next to them are displayed in a collapsed format, while the elements with a "−" sign next to them are displayed in an expanded format.

As depicted, storage group 1 includes one LUN, LUN 2. Some objects may be dragged in order to alter the logical arrangement of the data storage system. For example, a user may drag LUN 1 onto storage group 1, as depicted by arrow 34. This operation would cause LUN 1 to be added to storage group 1.

Figure 2:
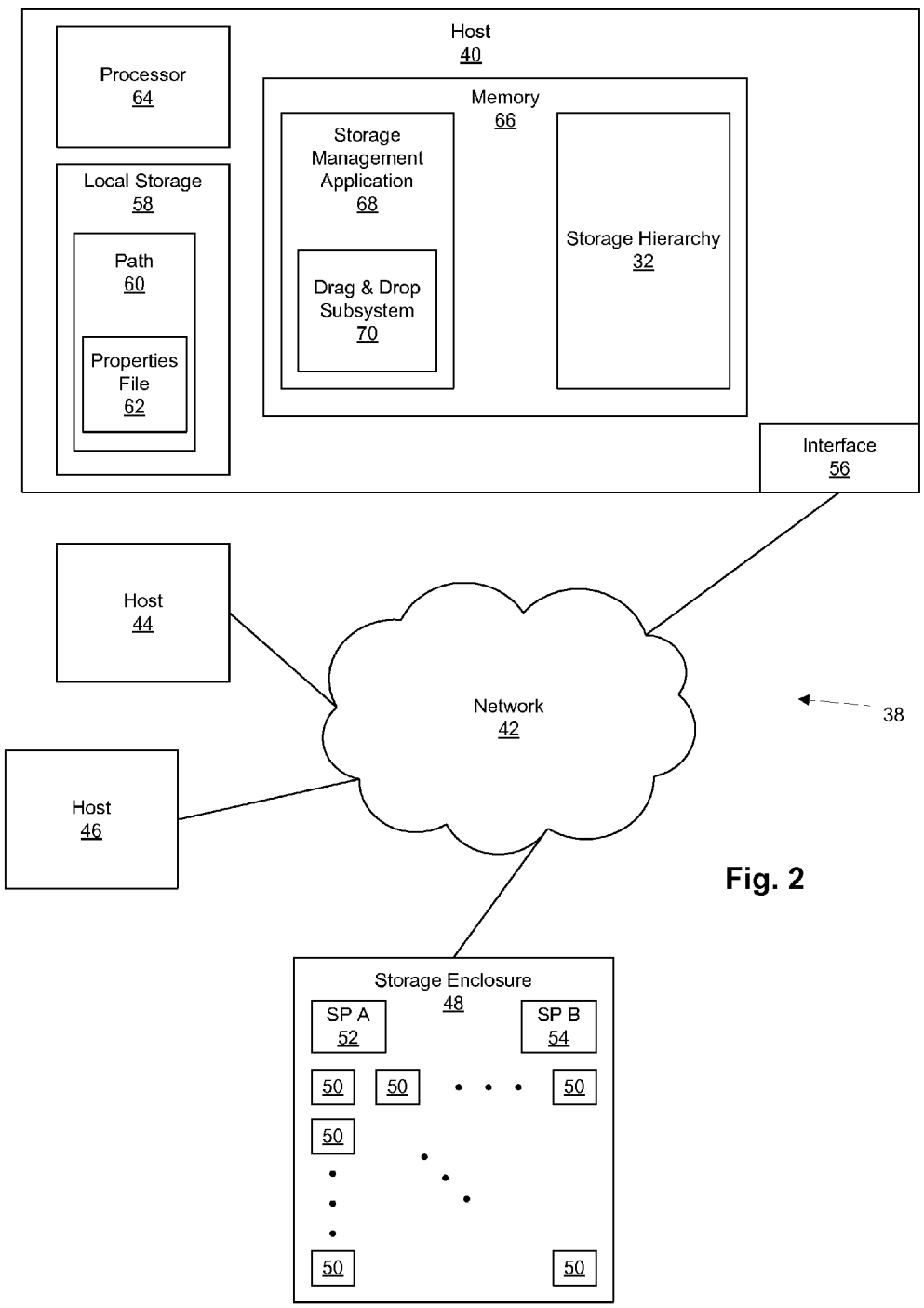
FIG. 2 illustrates an example system for use in practicing an embodiment.

FIG. 2 depicts an example system 38 for use in practicing an embodiment. Host 40 is connected to a network 42. Host 44 and host 46 might also be connected to the network 42. One or more storage enclosures (SEs) 48 are also connected to the network. SE 48 contains a plurality of disk drives 50, for example, 240 disks 50. SE 48 also contains two storage processors 52, 54.

Host 40 connects to the network 42 by means of a network interface 56. Host 40 also contains local storage 58, a processor 64 (which may include one CPU or multiple CPUs running in parallel), and memory 66. Local storage 58 stores a properties file 62, located within a path 60.

Memory 68 includes a management application 68, which includes a drag & drop subsystem 70. Management application 68 runs on processor 64 and accesses storage hierarchy 32, which is stored in memory 68. Management application 68 is able to access properties file 62.

Figure 3:
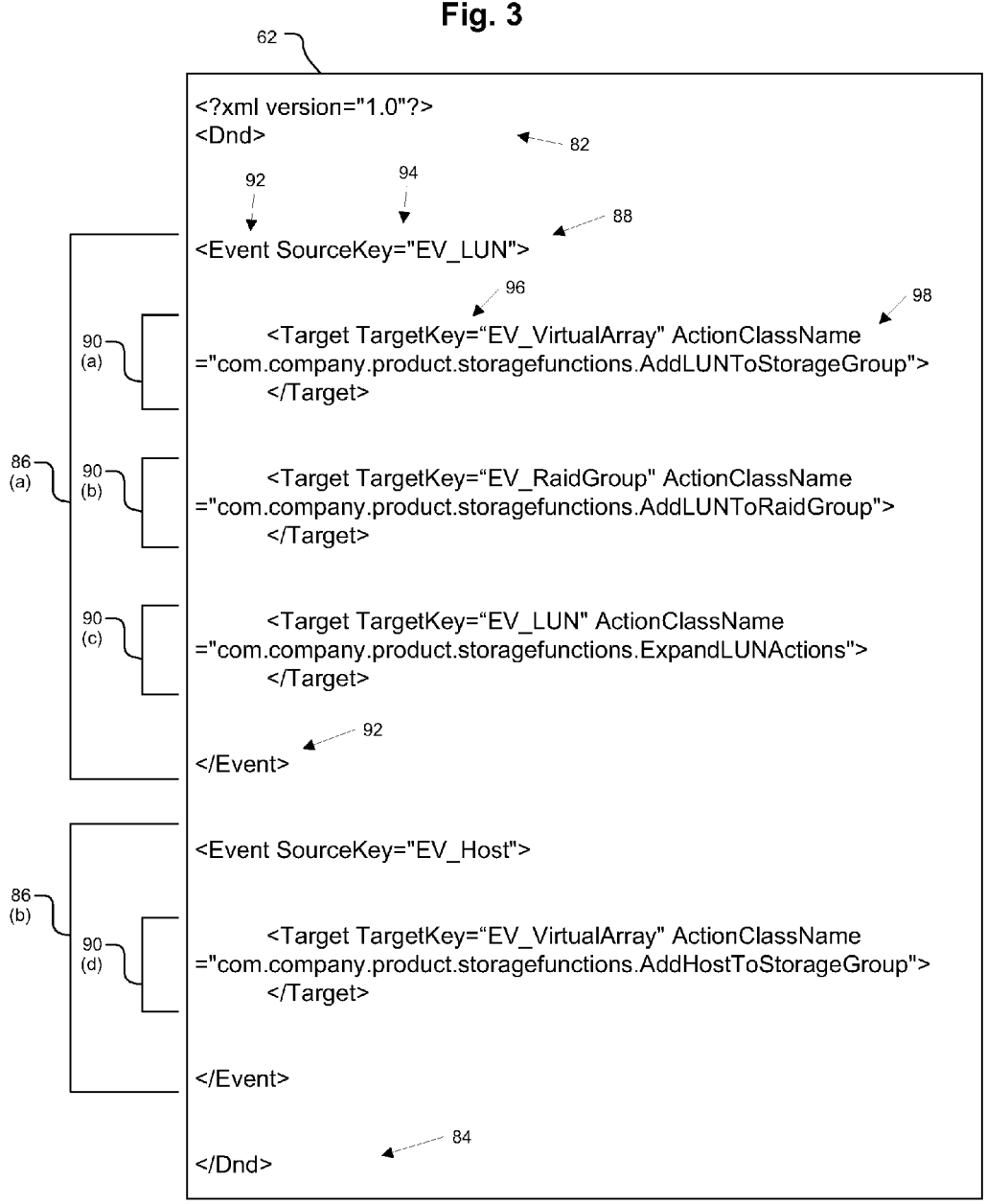
FIG. 3 illustrates an example properties file of one embodiment.

FIG. 3 depicts an example properties file 62 of one embodiment. As depicted, properties file 62 is an XML file, having an introductory XML tag at the beginning. It should be understood, that in other embodiments, properties file 62 could be another type of markup file, such as an SGML file. In yet other embodiments, properties file 62 could be yet another type of file, such as a binary data file.

As depicted in FIG. 3, properties file 62 includes a header 82 and a footer 84. Header 82 and footer 84 may represent a drag & drop element, as indicated by the <Dnd> and </Dnd> tags.

Between the header 82 and footer 84, properties file 62 contains one or more source elements 86 (for example, source elements 86(a), 86(b)). It should be understood that in some embodiments, the properties file 62 can contain multiple source elements, while in other embodiments, several properties files 62 are maintained, each properties file 62 including only one source element 86. Each source element 86 contains a header 88, one or more body elements 90, and a footer 92. Header 88 is a start-tag containing an identification of the element type (in this case "Event" indicating a source element) and an attribute definition 94 defining the SourceKey attribute. In first source element 86(a), SourceKey is defined to be EV_LUN, indicating that the source element represents a LUN. In second source element 86(*b*), SourceKey is defined to be EV_Host, indicating that the source element represents a Host. The presence of a source element 86 with a particular SourceKey definition in a properties file means that a drag & drop resource corresponding to that SourceKey definition is a valid draggable element. Footer 92 is an end-tag, formally closing the source element in accordance with standard XML.

Body elements 90, such as target elements 90(*a-d*), define valid drag & drop elements onto which a source drag & drop element may be dropped. Each target element 90 includes two attribute definitions 96, 98. Target definition 96 defines TargetKey to be a particular valid drag & drop target element onto which the source element defined by the SourceKey of the parent source element may be dropped. Action class definition 98 defines ActionClassName to be a reference to an action class to be called when the source element defined by the SourceKey of the parent source element is dropped on the target defined by TargetKey. As depicted, ActionClassName is a fully qualified JAVA method name.

According to properties file 62 as depicted in FIG. 3, a LUN element is a draggable element, which may be dropped onto a storage group (represented by TargetKey="EV_VirtualArray"), a RAID group (represented by TargetKey="EV_RaidGroup"), or another LUN (represented by TargetKey="EV_LUN"), while a Host element is also a draggable element, which is droppable only on a storage group (represented by TargetKey="EV_Virtual Array"). When a LUN element is dropped onto a storage group, the JAVA method com.company.product.storagefunctions.AddLUNToStorageGroup is called. When a LUN element is dropped onto a RAID group, the JAVA method com.company.product.storagefunctions.AddLUNToRaidGroup is called. When a LUN element is dropped onto another LUN, the JAVA method com.company.product.storagefunctions.ExpandLUNActions is called. When a Host element is dropped onto a storage group, the JAVA method com.company.product.storagefunctions.AddHostToStorageGroup is called.

Figure 4:
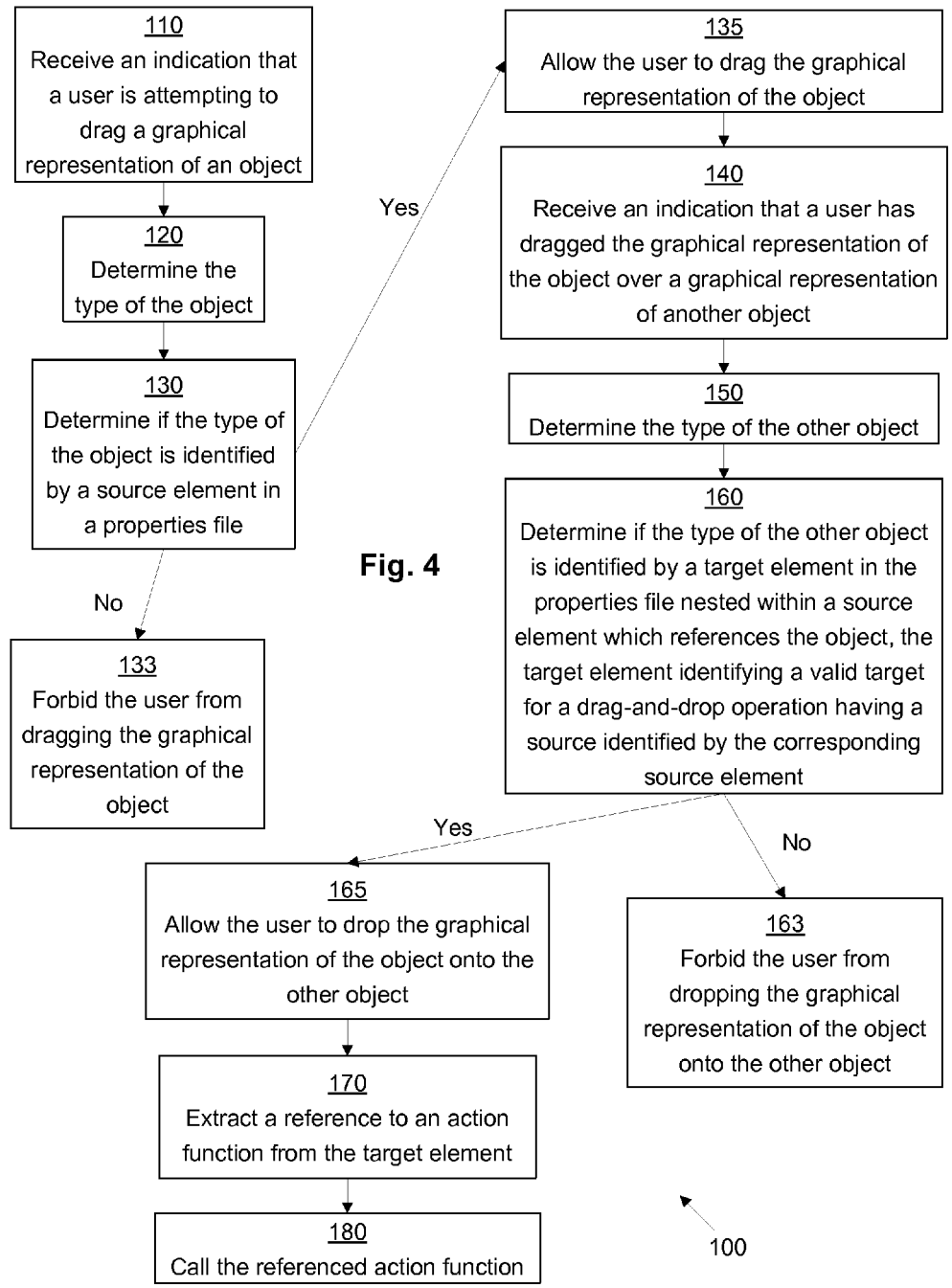
FIG. 4 illustrates an example method for performing a DnD operation in accordance with one embodiment.

FIG. 4 depicts a method 100 performed by a computer, such as host 40 from FIG. 2, while running storage management application 68, using drag & drop subsystem 70. In step 110, host 40 receives an indication that a user is attempting to drag a graphical representation of an object across a computer screen. For example, the user attempts to drag LUN 1 of object hierarchy 32 of FIG. 1. It should be understood that the dragged object is a drag & drop object, for example as defined in the JAVA standard java.awt.dnd package as well as in the standard Swing library. The notification may be made by a JAVA watch class, such as the javax.swing.TransferHandler class as is well-understood in the art, although other well-known means of notification may be used as well.

Upon receiving the indication of a drag operation, step 120 is performed. In step 120, host 40 determines the type of the dragged object. Thus, in the example, the type of the object would be EV_LUN, since it is a representation of a LUN being dragged. Once this is done, in step 130, it is determined if that object type is identified by a source element 86 of properties file 62 (see FIG. 3). If the object type is not identified by a source element 86 in the properties file 62, then, in step 133, the user is forbidden from dragging the graphical representation of the object across a computer screen. However, in the current example, since properties file 62 includes the line <Event SourceKey="EV_LUN">, in step 135, the user is permitted to drag the object.

In a continuation of method 100, the user may attempt to drag the object over another object. Thus, continuing in the above example, the user may attempt to drag LUN 1 over Storage Group 1. Thus, in step 140, host 40 receives an indication that the user has dragged the graphical representation of the dragged object over a graphical representation of another object, the other object being another logical or physical unit of a data storage system. Following step 140, in step 150 host 40 determines the type of the other object over which the first object was dragged. Thus, in this example, the type of the object would be determined to be an EV. VirtualArray, since it is a representation of a storage group.

In step 160, host 40 determines if the type of the other object is identified by a target element 90 in the properties file 62 nested within a source element 86 which references the object, the target element 90 identifying a valid target for a drag-and-drop operation having a source identified by the corresponding source element 86. If not, operation proceeds to step 163, forbidding the user from dropping the first object over the second object. If, however, the proper target element 90 is found within the properties file 62, then operation proceeds to step 165, allowing the user to drop the first object over the second object. Thus, in the present example, because the source object is a LUN, host 40 examines source element 86(*a*) (having SourceKey="EV_LUN") for a target element 90 having an attribute definition TaregtKey="EV_VirtualArray". Because target element 90(*a*) has this attribute definition, a storage group is a valid object over which a LUN may be dropped.

In some embodiments, when a first object is dragged over a valid target object, a graphical representation is made on the screen indicating that the target object is a valid target, even if the first object is not actually dropped there. For example, if the target object is displayed on-screen in a collapsed format, when a user hovers the object over the target and the target is determined to be a valid target, the target object may be expanded to be displayed in an expanded format.

Once a user drops the first object on the second object, step 170 may be performed, host 40 extracting a reference to an action function from target element 90. Thus, in the current example, because the second object corresponds to target element 90(*a*), the ActionClassName attribute definition from target element 90(*a*) is extracted, indicating a reference to an action method identified by the JAVA fully qualified name com.company.product.storagefunctions.AddLUNToStorageGroup. Then, in step 180, host 40 calls the referenced action function. Thus, for example, action function com.company.product.storagefunctions.AddLUNToStorageGroup might cause host 40 to modify the object hierarchy 32 stored in memory to include LUN 1 within storage group 1 and to update window 30 to indicate this change.

In some embodiments, instead of a reference to an action method, a reference is made to an action class. Such an action class is written to implement a standardized JAVA interface. Thus, the interface may define an abstract executeActionClass method which is to be called upon the instantiation of the particular action class that implements the interface.

The method 100 of FIG. 4 may be implemented in software. The software may be stored on a tangible computer-readable medium. A tangible computer-readable medium may include, for example, a magnetic disk, an optical disk, or a non-volatile flash-based memory device. When executed by a computer (e.g., host 40), the software causes the method 100 to be performed.

Figure 5:
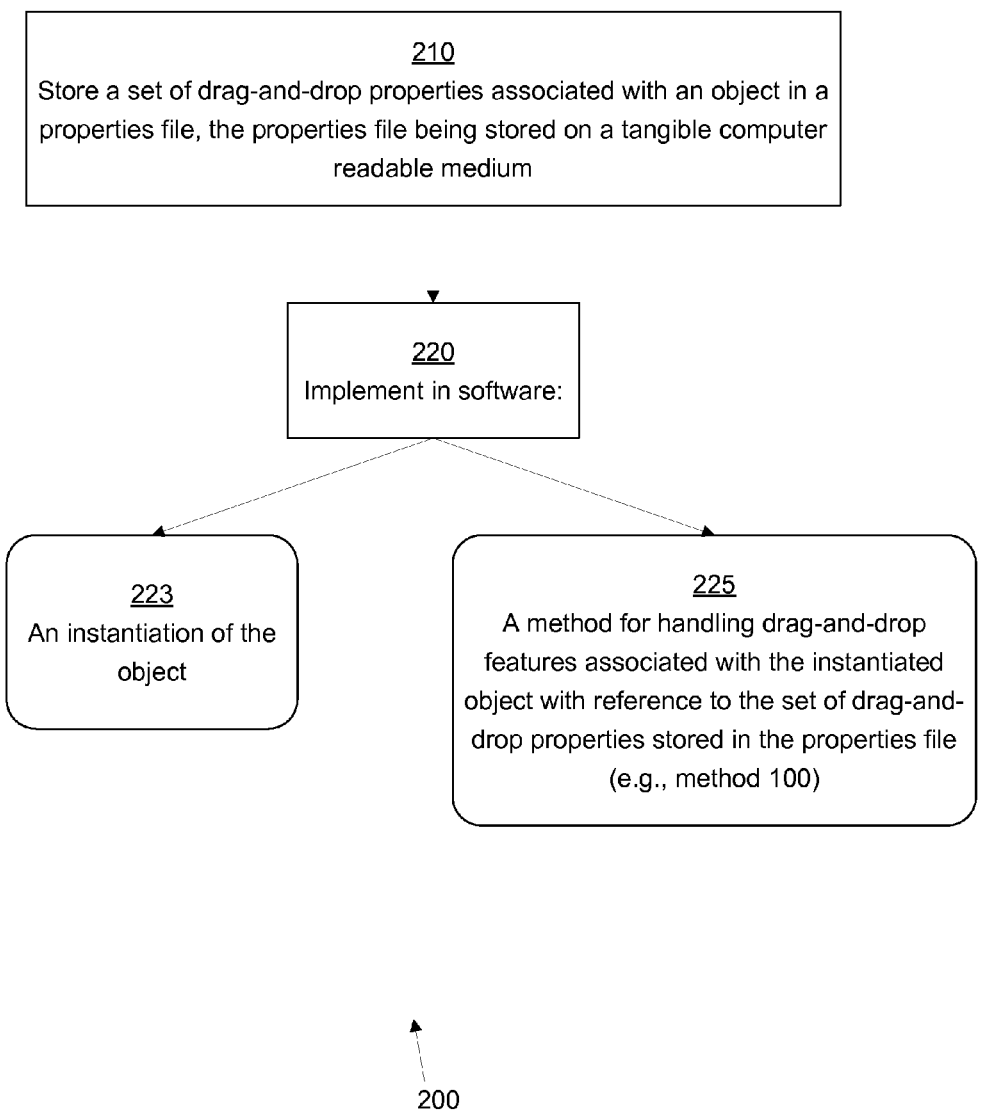
FIG. 5 illustrates an example method for developing a software application to perform a DnD operation in accordance with one embodiment.

FIG. 5 depicts a method 200 for developing a software application to perform a drag & drop operation in accordance with one embodiment. In step 210, a programmer stores a set of drag-and-drop properties associated with an object in a properties file 62, the properties file 62 being stored on a tangible computer readable medium, such as local storage 58 on host 40. Properties file 62, in some embodiments, includes multiple sets of drag-and-drop properties associated with multiple objects.

In step 220, the programmer implements various function in software, such as, for example, JAVA. In sub-step 223, the programmer defines a class corresponding to the object and writes code causing that class to be instantiated in at least one case. In sub-step 225, the programmer writes software code (such as, for example, JAVA code) to implement method 100. This implementation may include writing a DnD transfer handler class, which includes a function for parsing the XML in the properties file 62 as well as functions for determining whether a drag & drop object is draggable or droppable. It also contains code to call the appropriate action method when needed.

Method 200 is an improved method of implementing a drag & drop feature because it allows the draggability and dropability of various objects to be modified without making significant changes to the software code.

While various embodiments of the invention have been particularly shown and described, it will be understood by those skilled in the art that various changes in form and details may be made therein without departing from the spirit and scope of the invention as defined by the appended claims.

For example, while embodiments have been described as operating in a storage system context, the invention is not so limited. Thus, in other embodiments, drag & drop objects may represent objects that do not represent storage devices or other logical elements of a data storage system.

Furthermore, it should be understood that all embodiments which have been described may be combined in all possible combinations with each other, except to the extent that such combinations have been explicitly excluded.

Furthermore, it should be understood that the term "JAVA," as used in this Specification, refers to the JAVA software platform, version 6.0, as promulgated by Sun Microsystems, Inc. of Santa Clara, Calif. "JAVA" was a registered trademark of Sun Microsystems, Inc. at the time of filing. It should also be understood that all references to JAVA are by way of example only. In fact, another software platform could be used instead of JAVA.

What is claimed is:

1. A method including:
    receiving an indication that a user is attempting to drag a graphical representation of an object from an initial position in a multi-level object hierarchy depicted on a display;
    determining a type of the object;
    determining whether the type of the object is identified by a source element of one or more source elements in a properties file, the properties file being a text file written in a markup language and the properties file storing the one or more source elements, each source element identifying a valid source for a drag-and-drop operation;
    when the type of the object is identified by the source element in the properties file, allowing the user to drag the graphical representation of the object within the multi-level object hierarchy depicted on the display;
    when the type of the object is not identified by any source element in the properties file, forbidding the user from dragging the graphical representation of the object within the multi-level object hierarchy depicted on the display;
    receiving an indication that the user has dragged the graphical representation of the object over a graphical representation of an other object at a target position within the same multi-level object hierarchy depicted on the display, the target position being different than the initial position;
    determining a type of the other object;
    determining whether the type of the other object is identified by a target element in the properties file, the target element being nested within the source element which references the object, the target element identifying a valid target for a drag-and-drop operation having a source identified by the source element, and the target element including a reference to an action function;
    when the type of the other object is identified by the target element in the properties file nested within the source element identifying the object, allowing the user to drop the graphical representation of the object onto the graphical representation of the other object at the target position within the multi-level object hierarchy; and
    when the type of the other object is not identified by any target element in the properties file nested within the source element identifying the object, forbidding the user from dropping the graphical representation of the object onto the graphical representation of the other object at the target position within the multi-level object hierarchy;
    wherein:
        allowing the user to drop the graphical representation of the object onto the graphical representation of the other object includes:
            extracting the reference to the action function from the target element; and
            calling the referenced action function;
        the object represents a logical unit of storage (LUN) within a data storage system;
        the other object represents a storage group within the data storage system; and
        calling the referenced action function causes:
            the LUN to be added to the storage group; and
            the graphical representation of the other object to expand to depict all LUNs included within the storage group.

2. A non-transitory computer readable medium storing computer software, which, when executed on a computer, causes the computer to perform:
    receiving an indication that a user is attempting to drag a graphical representation of an object from an initial position in a multi-level object hierarchy depicted on a display;
    determining a type of the object;
    determining whether the type of the object is identified by a source element of one or more source elements in a properties file, the properties file being a text file written in a markup language and the properties file storing the one or more source elements, each source element identifying a valid source for a drag-and-drop operation;
    when the type of the object is identified by the source element in the properties file, allowing the user to drag the graphical representation of the object within the multi-level object hierarchy depicted on the display;
    when the type of the object is not identified by any source element in the properties file, forbidding the user from dragging the graphical representation of the object within the multi-level object hierarchy depicted on the display;
    receiving an indication that the user has dragged the graphical representation of the object over a graphical representation of an other object at a target position within the same multi-level object hierarchy depicted on the display, the target position being different than the initial position;

determining a type of the other object;

determining whether the type of the other object is identified by a target element in the properties file, the target element being nested within the source element which references the object, the target element identifying a valid target for a drag-and-drop operation having a source identified by the source element, and the target element including a reference to an action function;

when the type of the other object is identified by the target element in the properties file nested within the source element identifying the object, allowing the user to drop the graphical representation of the object onto the graphical representation of the other object at the target position within the multi-level object hierarchy; and when the type of the other object is not identified by any target element in the properties file nested within the source element identifying the object, forbidding the user from dropping the graphical representation of the object onto the graphical representation of the other object at the target position within the multi-level object hierarchy;

wherein:

allowing the user to drop the graphical representation of the object onto the graphical representation of the other object includes:

extracting the reference to the action function from the target element; and calling the referenced action function;

the object represents a logical unit of storage (LUN) within a data storage system;

the other object represents a storage group within the data storage system; and calling the referenced action function causes the computer to perform:

adding the LUN to the storage group; and expanding the graphical representation of the other object to depict all LUNs included within the storage group.

3. A method as in claim 1 wherein allowing the user to drop the graphical representation of the object onto the graphical representation of the other object includes expanding the graphical representation of the other object.

\* \* \* \* \*